Jan. 31, 1933.  J. C. McCUNE  1,895,477
BRAKE VALVE DEVICE
Filed June 18, 1930
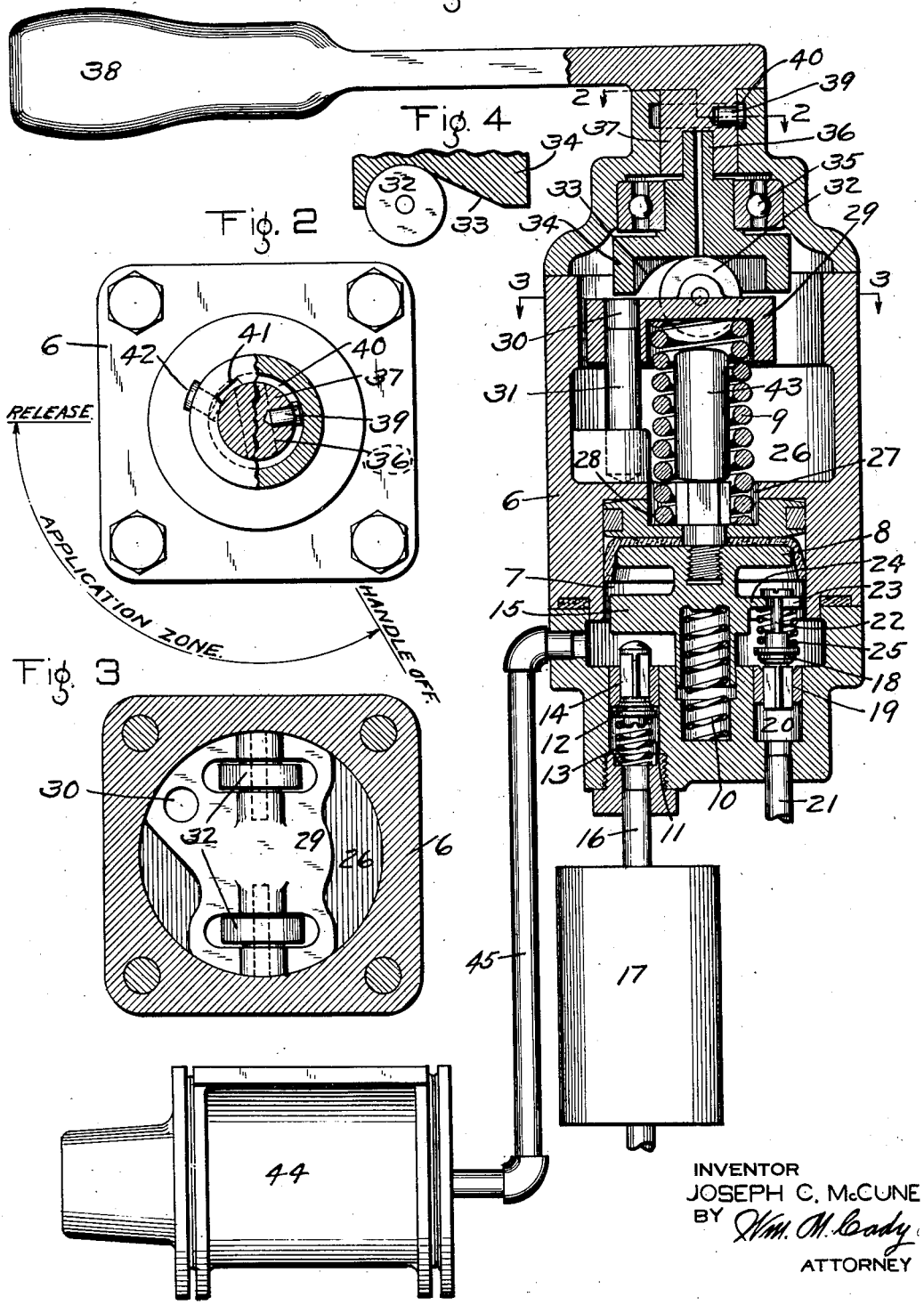
INVENTOR
JOSEPH C. McCUNE
BY *Wm. M. Cady*
ATTORNEY Patented Jan. 31, 1933

1,895,477

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE VALVE DEVICE

Application filed June 18, 1930. Serial No. 461,944.

This invention relates to fluid pressure brakes and more particularly to brake valve devices of the type employed with straight air brake apparatus.

An object of the invention is to provide an improved brake valve device of the type in which the fluid pressure is regulated according to the degree of compression of a spring.

Another object of the invention is to provide a brake valve device of the above type in which means are provided for ensuring the operation of the device to effect an application of the brakes in the event of failure of the spring.

Another object of the invention is to provide an improved brake valve device of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing; Figure 1 is a vertical longitudinal section of a brake valve device embodying the invention, showing the same in release position; Fig. 2 is a horizontal section taken on the line 2—2 of Fig. 1; Fig. 3 is a horizontal section taken on the line 3—3 of Fig. 1; and Fig. 4 is a detail view showing a portion of the cam and one of the rollers associated therewith.

Referring to the drawing, the brake valve device may comprise a casing 6 having a piston chamber 7 containing a piston 8 subject on one side to the pressure of a heavy coil spring 9 and subject on the opposite side to the pressure of a light coil spring 10 which is disposed within a hollow guiding lug carried by the piston for sliding engagement with a recess provided in the casing. The piston 8 is also subject to the pressure of fluid supplied to chamber 7 during the operation of the device, as will be hereinafter more fully described.

Contained in a chamber 11 formed in the casing beneath the piston chamber 7, is a fluid pressure supply valve 12 which is normally held seated by a coil spring 13 mounted in the chamber 11. The supply valve 12 has a fluted stem extending through an opening 14 formed in the casing between the valve chamber 11 and the piston chamber 7, extremity of said valve stem terminating a suitable distance below an abutment 15 carried by the piston 8 when the piston is in its up position. The valve chamber 11 is connected by pipe 16 with a source of fluid under pressure, such as a reservoir 17.

Contained in the piston chamber 7 is a release valve 18 having a fluted stem extending through an opening 19 formed in the casing between said piston chamber and a chamber 20 which is connected to the atmosphere by a pipe 21.

The release valve 18 is provided with an upwardly extending headed stem 22 which passes through a slot 23 formed in a laterally projecting flange 24, with which the piston 8 is provided.

For the purpose of pressing the release valve 18 away from the piston 8, a coil spring 25 is interposed between the head of said valve and the flange 24.

The construction is such that the release valve 18 is so connected to the piston 8 that in normal release position, said valve is held off its seat, and during the operation of the device, the release valve is seated by the pressure of spring 25 which is compressed by the downward movement of the piston.

It will be noted that the release valve 18 is so connected to the piston 8, that a limited amount of movement of the piston relative to the valve is provided for. This is desirable, since it permits the piston to move a slight distance away from the valve 18, when said valve is seated, without unseating the valve.

The spring 9 is contained in a chamber 26 formed in the casing above the piston chamber 7 and connected thereto through an opening 27, which is made large enough to permit the spring 9 to pass therethrough. The bottom of the spring 9 is mounted in a recess 28 formed in the top of the piston 8.

Also contained in the chamber 26 and enclosing the top of the spring 9, is a cap 29 which is mounted for rectilinear movement in the chamber. In plan the cap 29 has an irregular contour and only a portion of the periphery thereof engages the wall of the chamber 26, so that friction will be reduced to a minimum. In order to guide the cap and prevent rotative movement thereof, the cap is provided with an opening 30 adapted to receive a stem 31 fixed within the casing.

Journalled on the top of the cap 29 is a pair of diametrically disposed rollers 32, which engage with cam faces 33 formed on the lower side of a cam 34 supported in the upper portion of the casing 6 by an annular ball bearing 35. The cam 34 is extended upwardly above the ball bearing 35 and terminates in a tongue 36 for receiving the slotted offset portion 37 of an operating handle 38.

For the purpose of locking the handle 38 in position and for preventing the removal thereof except in handle off position, a headed pin 39 mounted in the slotted offset portion 37 of the handle and projecting therefrom, has its head disposed in an annular groove 40 formed in the upper portion of the casing 6. The groove 40 provides a track for the head of the pin 39, and said groove is intersected at one point by an opening 41 which extends upwardly to the top of the casing, and through which opening the pin 39 is inserted when the handle 38 is being applied to the brake valve device, and through which opening said pin can be passed when it is desired to remove the handle from the brake valve device. The position of the opening 41 is located by a pin 42 mounted in the upper portion of the casing and intersecting the groove 40, as shown in Fig. 2. The pin 42 is adapted to provide a stop for preventing further rotative movement of the handle 38, when said handle is turned toward the handle off position.

Mounted within the spring 9 is a follower strut 43 having a height less than the normal height of the spring 9.

In operation, when the handle 38 is in release position, the rollers 32 are disposed in the upper portions of the cam faces 33 of the cam 34.

If it is desired to apply the brakes, the handle 38 is operated to rotate the cam 34, and due to the downwardly inclination of the cam faces 33, the cap 29 is moved downwardly in a vertical path, being guided by the wall of the chamber 26, and being prevented from rotating by the stem 31. This downward movement of the cap 29 compresses the spring 9.

Since the spring 9 acts on the piston 8, said piston will be moved downwardly by the pressure of the spring. In this downward movement of the piston, the release valve spring 25 is compressed and acts on the release valve 18 to seat the same, thereby closing the communication through which the piston chamber 7 is connected to the atmosphere, and the abutment 15 engages the upwardly projecting end of the stem of the supply valve 12 and unseats said valve.

Fluid under pressure is then admitted to piston chamber 7 from the valve chamber 11, and from thence flows to the brake cylinder 44, through pipe 45, to effect an application of the brakes.

When the pressure in piston chamber 7, acting on the piston 8, slightly exceeds the opposing pressure of the spring 9, the piston 8 will be moved upwardly, so as to permit the supply valve 12 to be seated by spring 13 and thus cut off the further supply of fluid under pressure to the brake cylinder. Since the upward movement of the piston 8 will be slight, the release valve 18 will be held seated by its spring 25.

It will now be seen that both the supply valve 12 and the release valve 18 are closed or lapped, and the parts will remain in this position as long as the pressure in the brake cylinder corresponds with the pressure to which the spring 9 is set.

While the brakes are applied, the brake cylinder pressure may be increased by turning the handle 38 so as to further compress the spring 9, whereby the abutment 15 is again operated by the downward movement of the piston 8, so as to again open the supply valve 12.

When the pressure in the brake cylinder and in piston chamber 7 has been increased to correspond with the increased pressure of spring 9, the valve 12 will be again closed, in the manner hereinbefore described.

If leakage from the brake cylinder should occur while the handle 38 is in a given brake applying position, the reduced pressure of the brake cylinder in chamber 7 acting on the piston 8 will permit the spring 9 to operate the piston 8, so as to open the supply valve 12 and admit fluid to the brake cylinder to compensate for the leakage.

The amount of brake cylinder pressure obtained is determined by the position of the handle 38, the maximum pressure being obtained in handle off position in which the rollers 32 engage the lower flat faces of the cam 34.

When it is desired to release the brakes, the brake valve handle 38 is turned toward release position, so that a reduction in the compression of spring 9 is effected. This reduction in spring pressure on piston 8 permits the higher brake cylinder pressure on the opposite side of the piston to move the piston upwardly, and this action lifts the release valve 18 from its seat. Fluid under pressure in the brake cylinder will then be vented from piston chamber 7 and the brake cylinder, to the atmosphere, so as to effect the release of the brakes.

In the event that the spring 9 should break during the operation of the device, the cap 29 will engage the follower strut 43, and the latter will act on the piston 8 and move the same downwardly, so as to seat the release valve 18 and unseat the supply valve 12, so that fluid under pressure is supplied to the brake cylinder 44. In this way an application of the brakes can be effected, even though the spring 9 should fail.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure controlling valve device, the combination with a movable abutment and means operated by said abutment for controlling the supply of fluid under pressure, of a spring acting on said abutment, a cap engaging said spring, rollers carried by said cap, and a rotatable cam having cam faces adapted to engage each roller.

2. In a fluid pressure controlling valve device, the combination with a movable abutment and means operated by said abutment for controlling the supply of fluid under pressure, of a spring acting on the abutment, a cap engaging said spring, means for guiding said cap and for also preventing rotation thereof, rollers carried by said cap, a cam having cam faces adapted to engage each roller, and means for rotating the cam.

3. In a fluid pressure controlling valve device, the combination with a piston and valve means operated by said piston for controlling the supply of fluid under pressure, of a spring acting on the piston, and means for varying the compression of said spring comprising a cap member engaging said spring, anti-friction members carried by said cap member, and a rotatable cam device having a cam face engaging each of said anti-friction members.

4. In a fluid pressure controlling valve device, the combination with a movable abutment and valve means operated by said abutment for controlling the supply of fluid under pressure, of a spring acting on the abutment, a cap engaging said spring, a pair of diametrically disposed rollers carried by said cap, a cam having a cam face adapted to engage each of said rollers, and means detachably connected to the cam for rotating the same.

5. In a fluid pressure controlling valve device comprising a casing having a guide recess formed therein, the combination with a piston forming a pressure chamber in said casing, of resilient means for depressing said piston, means for varying the pressure of said resilient means on said piston, a supply valve mounted in said casing for controlling the flow of fluid to said chamber, a spring for maintaining said valve normally closed, an exhaust valve carried by said piston for controlling the release of fluid from said chamber and normally maintained open by said piston, said exhaust valve being moved to closed position when said piston is depressed, means on said piston adapted to engage and move said supply valve to open position after said exhaust valve is closed, a hollow lug on said piston engaging said casing within said recess for guiding said piston, and a spring disposed within said lug and said recess for yieldably resisting the movement of said piston when the piston is depressed.

In testimony whereof I have hereunto set my hand, this 16th day of June, 1930.

JOSEPH C. McCUNE.